(12) United States Patent
Yonover et al.

(10) Patent No.: US 6,678,395 B2
(45) Date of Patent: Jan. 13, 2004

(54) VIDEO SEARCH AND RESCUE DEVICE

(76) Inventors: Robert N. Yonover, 219 Koko Isle Cir., Suite 602, Honolulu, HI (US) 96825; Jonathan C. Gradie, 169 Kuukama St., Kailua, HI (US) 96734; Dave Dikeman, 444 Nahua St., #211, Honolulu, HI (US) 96815

( * ) Notice: Subject to any disclaimer, the term of this patent is extended or adjusted under 35 U.S.C. 154(b) by 95 days.

(21) Appl. No.: 09/814,167

(22) Filed: Mar. 22, 2001

(65) Prior Publication Data

US 2003/0198364 A1 Oct. 23, 2003

(51) Int. Cl.[7] .................................................. G06K 9/00
(52) U.S. Cl. ....................................... 382/103; 382/191
(58) Field of Search ................................ 382/100, 103, 382/162, 191, 270, 278; 250/206.1, 206.2, 206.3; 244/3.17

(56) References Cited

U.S. PATENT DOCUMENTS

| | | | |
|---|---|---|---|
| 5,196,688 A | * 3/1993 | Hesse et al. | 250/203.6 |
| 5,444,441 A | 8/1995 | Sutton | 340/850 |
| 5,793,034 A | 8/1998 | Wesolowicz et al. | 250/216 |
| 5,937,078 A | * 8/1999 | Hyland et al. | 382/103 |
| 6,249,589 B1 | * 6/2001 | Hoch | 382/103 |
| 6,282,301 B1 | * 8/2001 | Haskett | 382/103 |
| 6,298,143 B1 | * 10/2001 | Kikuchi et al. | 382/103 |
| 6,392,747 B1 | * 5/2002 | Allen et al. | 356/141.1 |
| 2002/0012451 A1 | * 1/2002 | Lin | 382/103 |

* cited by examiner

Primary Examiner—Andrew W. Johns (57) ABSTRACT

A device for locating a lost target or for surveillance and monitoring of an area for a target having spectral and spatial profiles comprises a digital multi-spectral camera aimed at or scanning an area of interest, the camera generating spectral and spatial output; and a computer including a program for processing in real-time the output of the camera, triggering an alarm when the target is detected from the output.

33 Claims, 9 Drawing Sheets

FIG.8

VIDEO SEARCH AND RESCUE DEVICE

FIELD OF THE INVENTION

The present invention relates generally to the automatic detection of lost persons or crafts and the automatic surveillance and monitoring of sensitive areas, and more particularly, to a system wherein a multi-spectral video camera is combined with computer algorithms to automatically and in real-time detect targets having unique specific spectral and spatial characteristics, such as visual distress streamers, boats, etc.

BACKGROUND OF THE INVENTION

The ability-to find persons lost at sea or on land remains a challenge, even with today's advancements in electronic locating devices. There are a number of visual distress signals available today that increase a person's probability of detection by increasing their signal target. Most of these distress signals suffer from their short-lived duration, their high failure rate, or their high false alarm rate. Smoke flares, aerial flares, and sea marker dye are some of the more common visual distress signals; however, they all suffer from the shortcoming described above. With the advent of the distress signal streamer, disclosed in U.S. Pat. No. 5,421,287, there no longer are problems with duration, failure rate, or false alarms. Despite this advancement, however, the distress signal streamer still has to be visually spotted by a human in order for a successful rescue to take place. The humans searching by visual means above are prone to periods of inattention and reduced performance.

Even with the best emergency locating beacons (e.g. EPIRB's and ELT's), the search pilots must still visually locate a lost person, prior to rescue. Searchers can home in on the signal; however, time is usually of the essence due to cold water, injury, shark threat, enemy threat, and other factors.

Current surveillance and monitoring procedures also suffer from their reliance on human vision and attention to successfully complete many tasks.

Therefore, the search portion of the task can nevertheless be improved to supplement the human eye.

OBJECTS AND SUMMARY OF THE INVENTION

It is an object of the present invention to provide search and rescue crews with a device that incorporates multi-spectral cameras and computer software to enable to more effectively and efficiently locate persons that are lost at sea.

It is another object of the present invention to enhance the capability of surveillance and monitoring by using digital imaging multi-spectral camera coupled to a real-time computer software.

It is yet another object of the present invention to permit the device to be mounted on aircraft, boats, land vehicles, fixed land stations, and/or spacecraft to achieve enhanced search and rescue and surveillance and monitoring capabilities.

It is still another object of the present invention to provide a device that incorporates multi-spectral cameras and computer software that can be readily modified to detect specific spectral and spatial targets of interest.

It is another object of the present invention to provide a device that incorporates multi-spectral cameras and computer software with a capability to register, in real-time, an audio and visual alarm once a target has been detected, as well as recording the GPS position of the located target.

In summary, the present invention provides a device for locating a lost target or for surveillance and monitoring of an area for a target having spectral and spatial profiles, comprising a digital multi-spectral camera aimed at an area of interest, the camera generating spectral and spatial output; and a computer including a program for processing in real-time the output of the camera, and triggering an alarm when the target is detected from the output.

These and other objects of the present invention will become apparent from the following detailed description.

DETAILED DESCRIPTION OF THE INVENTION

Figure 1:
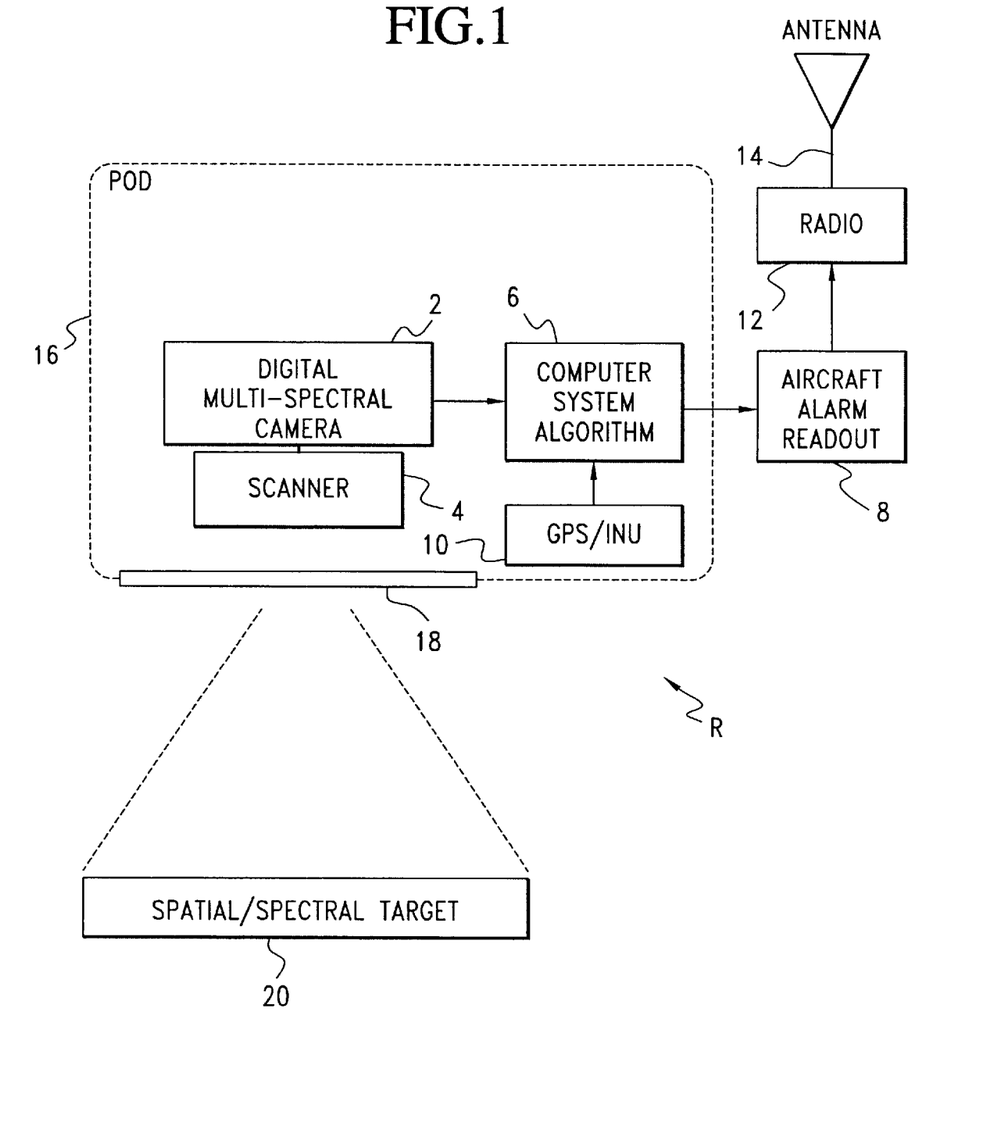
FIG. 1 is a block diagram of a video search and rescue device made in accordance with the present invention.

A video search and rescue device R made in accordance with the present invention is disclosed in FIG. 1. The apparatus R comprises a digital multi-spectral camera 2, which is scanned across the flight path of a search and rescue aircraft by a scanner 4. The scanner 4 allows for a larger sweep width, but may be omitted, if desired. The digital imagery output of the camera is sent to a computer 6 programmed to search for specific target characteristics and to sound an alarm device 8 when there is detection. A GPS device 10, preferably from the aircraft's GPS system, provides a GPS signal to the computer 8 to mark the absolute coordinates in longitude and latitude location of the detected object when the alarm was received. This will allow the pilot to return to its coordinates as deemed necessary. A radio 12 with an antenna 14 may be used to transmit the location of the detected object to a remote location as, for example, when the aircraft is unmanned.

The camera 2 can record aerial images in a broad swath depending on the arrangement of the camera lenses, orientation and ability to move or scan as they record images. The camera 2 is adapted for continuous imaging and scanning of large areas along the flight path. The computer 6 permits the camera images to be scanned in real-time to search for pre-programmed spatial and spectral targets. The camera 2 may include four focal planes, each plane imaging a separate spectral color determined by an interference filter of approximately 25–40 nm in bandwidth. The spectral bands are determined by the unique spectral properties of the ocean and the distress signals used, such as banners, fluorescent dyes, etc. The preferred focal planes are silicon-based CCD in the visible (400–1000 nm) and the near infrared (1000–2000 nm) range. The camera outputs a stream of digital data to the computer. The focal planes of the camera 2 can be either a two-dimensional detector array for framing camera imaging; a rectangular (one dimensional) linear array for linear scanning and with multiple linear stages for time-delay-integrate (TDI) imaging; or a point detector for spot scanning of the search area.

In linear scanning systems, a linear array of CCD elements (dimensions 1×N where N is the length of the array) is aligned perpendicular to the scan path (i.e., N elements aligned cross-track) and the image is then scanned at a known rate (much like a copy machine or PC-based scanner). In a single linear array CCD, the linear CCD is read out at a clock rate corresponding to the speed at which the linear CCD is scanned past the image. The digital data from the linear CCD is then reconstructed into an image by lining up each scanned line in the same sequence in was recorded.

Time delay integration (TDI) is used in CCD image technology to increase the effective exposure time for linear scanning imaging systems. In TDI the single linear array is replaced with an array of dimensions M×N, where N is the cross-track direction and M is the along-track direction. The scanning concept is the same as in the 1×N array except that the pixels are clocked in the along-track (M) direction at the exact same rate that the image is moving past the CCD. In this manner, for the Nth pixel in the cross-track direction, the charge transfer goes from (1,N) to (2,N) to (M,N) whereupon the Mth line is read out to the data system. The effect if this is to increase the exposure of each point in the image by a factor of M (number of integration stages). In analogy to the copy machine or PC-based scanner, it would be as if the same image had been scanned M-times to increase the length of the exposure. A single linear array CCD would have to scan M-times slower to gain the same exposure time for each of its N CCD elements.

A two dimensional array is analogous to a piece of film in a camera on which an image is recorded. The difference is that the digital camera uses "electronic film" also called a two-dimensional CCD array. The reason this approach is called a "framing" camera is that it takes a "frame" at a time (like film) rather that a scan-line at a time in the TDI case.

A "rectangular" CCD array is an array with dimensions M×N where M is much smaller than N. The value of M is called the number of TDI stages (increases in exposure).

A point detector for spot scanning is a single CCD element, e.g., a 1×1 array (N=1, M=1). The spot detector can detect only one spot at a time. To build an image, the spot must be scanned in both x and y directions to build an image.

A framing camera operates analogously to a normal film movie camera. Each frame is exposed and immediately transferred away from the focal plane (where the lens forms the image). For a film movie camera, the take-up reel transfers the exposed film physically, typically at 30 frames-per-second. For the CCD camera using a 2-dimensional array in a framing camera mode, the image transfer is done electronically and written to a computer disk or magnetic tape. The rate of transfer can be varied according to the application: at 30-frames-per-second for movies, hundreds of frames-per-second for high-speed imaging or a single frame every few seconds (much like a normal still camera), as in the present invention.

The camera 2 is preferably configured for wide field of view searching and rapid data acquisition at about 10–30 frames/sec. The camera 2 is preferably configured to have a cross-track field of view of >60° with an instantaneous field of view (pixel size) of 0.25 meters at nadir from an altitude of 300 meters. For the present invention, imaging is preferably limited to a cross-track field of view of ±45° in an aircraft moving between 50 and 100 m/s ground speed, to give a maximum frame rate (including overlap) of about 10 fps with an exposure time of 1 ms to minimize motion-induced smear.

The device R may be enclosed within a housing 16 with a window 18 through which the camera looks at a target 20. The housing 16 may be in the form of a pod which may be secured to the exterior of the aircraft.

Figure 2:
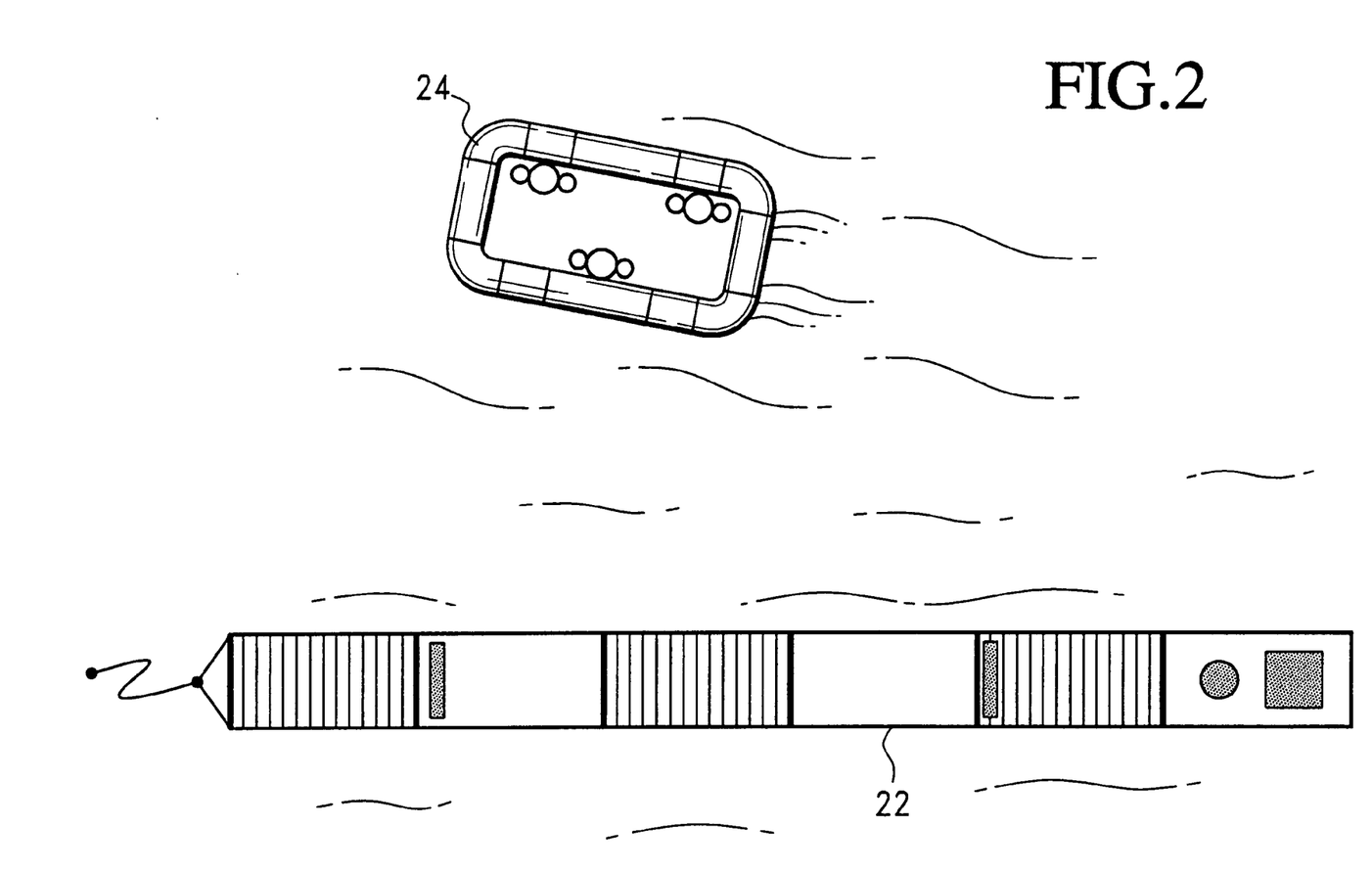
FIG. 2 is an aerial view of a distress streamer used as an example of an object that can be detected by the present invention.

The target 20 may be a distress signal streamer 22, a life raft 24 or any other objects whose spectral (color) and spatial (shape) characteristics can be programmed into the computer 6. The streamer 22 is disclosed in U.S. Pat. No. 5,421,287. The streamer 22 is rectangular with a bright orange color. The camera 2 is preferably tuned to the specific color of the streamer 22, which is the standard "international orange" distress banner approved by the U.S. Coast Guard.

The device R will be further described using the streamer 22 as the target object. However, it should be understood that the device R may be used to detect other targets with different spectral and spatial signatures.

The streamer 22 would typically be deployed by a lost person to aid in the search and rescue operation. The streamer 22 provides a large rectangular surface in bright orange to increase the visual footprint of the lost person, thereby increase the probability of being spotted by the search and rescue team. A person or lost craft with the streamer 22 trailing behind it changes the target from a virtual "speck" to a "speck" with a 25 foot or 40 foot orange tail. The camera 2 is preferably tuned to the basic color of the distress streamer 22, which is orange.

Figure 3:
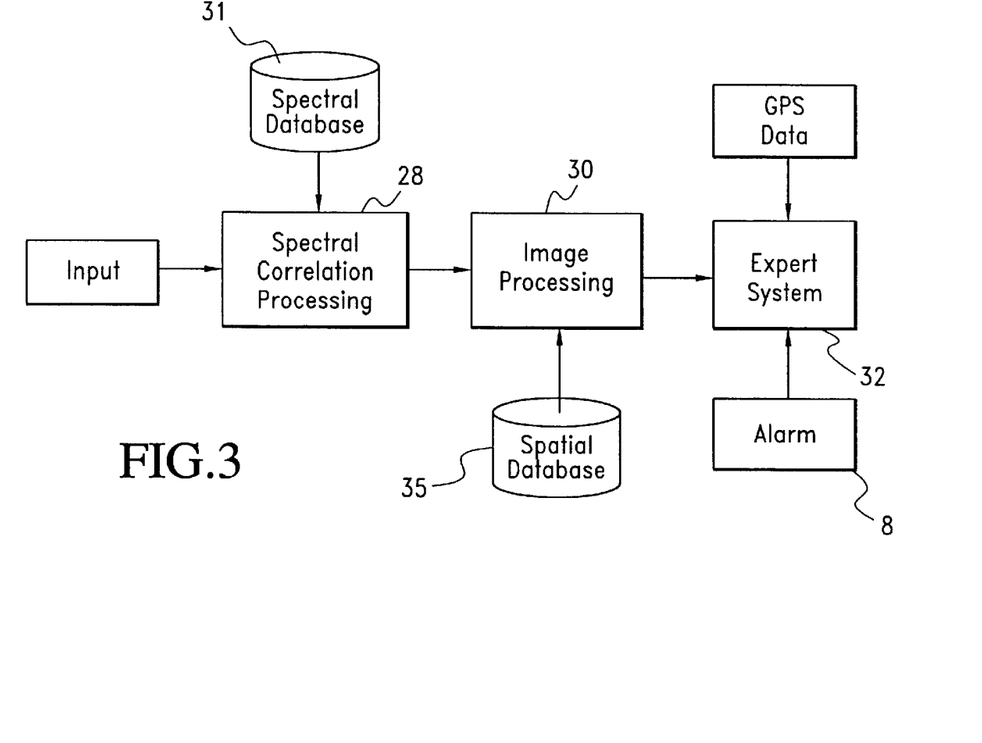
FIG. 3 is a flowchart of an algorithm for processing the output of a digital camera to automatically in real-time detect unique specific spectral and spatial targets.

An algorithm 26 used to process in real-time the stream of digital data from the camera 2 is disclosed in FIG. 3. The algorithm 26 is preferably implemented using Real-Time Interactive Programming and Processing Environment (RIPPEN®) available from ORINCON Hawaii, Inc.

Hyperspectral or multispectral imagery data are a series of digitized pictures of the same image that contain both spatial and spectral information. These pictures are stacked to form a multispectral cube. Each image in the hyper or multispectral (typically, multispectral imagery consists of a handful of spectra, perhaps a dozen or fewer; hyperspectral imagery often times consists of hundreds of spectra) cube represents a certain frequency bandwidth ('color') of the electromagnetic spectrum. As an hypothetical example, given a normal optical camera and three filters, say red blue and green, a hyperspectral data cube can be made by merely taking a snapshot of the same image three times using a different spectral filter each time, digitizing the images so that each pixel in the image corresponds to a numeric value, and then stacking the images into a cube. By constructing such a cube, spatial information (each image shows normal 'x-y' information) is obtained, and a three point spectra for each pixel can be formed, yielding spectral information. To form a spectra, a specific location in the image is selected (i.e. select a specific pixel in the image) and the digitized values for each of the three spectral bands in the multispectral cube are collected. To plot the spectra, the digitized values (d1, d2, d3) are plotted (b1, b2, b3) which are the center frequencies of the filters used.

These spectra which have been plotted are nothing more than measurements of reflected energy. All objects reflect a certain amount of electromagnetic energy. The intensity of this reflected energy can be measured at various wavelengths. Spectra are then constructed by plotting intensity versus wavelength. Many objects and substances have spectral characteristics that are unique. A unique spectral "signature" allows that object or substance to be identified through various spectral analyses.

The real time data stream from the camera 2 is processed for spectral correlation at 28. During spectral processing, each pixel is compared with a database of target pixels. Spectral processing consists of computing the correlation coefficient and thresholding these coefficients for the purpose of finding possible targets of interest. The spectral envelope of the incoming signal is correlated with a library 31 of known spectral signatures, such as that of streamer 22. The spectral database 31 is generated from data gathering experiments. In the standard method of correlation, the spectral envelope is treated as a function, and it is the functional correlation of the spectral envelope with a database spectra that provides the classifications test statistics.

Each pixel location in the hyperspectral cube contains spectral information which is plotted into a spectrum, as described above. Correlation is performed between the shape (functional envelope) of formed spectrum with a library of known spectra. This measurement yields one number, the correlation coefficient, calculated as follows.

$$\text{COVARIANCE} = \text{cov}(x,y) = \overline{xy} - \overline{x}\,\overline{y}$$

$$\text{CORRELATION\_COEFFICIENT} = \rho(x, y) = \frac{\text{cov}(x, y)}{(\text{cov}(x, y)\text{cov}(y, y))^{\frac{1}{2}}}$$

where x is the input spectra, y is the database spectra and $\overline{x}$ denotes the mean x. The correlation coefficient is normalized so that $-1 \leq \rho \leq 1$.

A 'correlation image' is formed by inserting the correlation coefficient metric value into the 'x-y' location of the spectra being sampled (i.e., each pixel is replaced with its calculated correlation coefficient). In this way the correlation image corresponds spatially in a one-to-one fashion with the original spatial cube. The cube has now been 'flattened' in the spectral direction and a 2-d correlation image is generated. In this correlation image, bright spots (corresponding to correlation values near 1.0) indicate spectral matches. Since the target is orange streamer, a bright spot then means that the pixel contains orange spectral content. The correlation image can then be thresholded. A threshold is set so that any pixel value above the threshold is set to 1.0 (lit) and anything below is set to 0.0 (unlit). By thresholding, a binary correlation image is generated, such as that shown in FIG. 4B.

If the threshold is too low, all target pixels will be detected but at the expense of many false alarms. The increase of many false alarms causes a subsequent failure in the image processing part of the algorithm and as a result targets go undetected. Raising the threshold to a higher value removes false alarms and allows for cleaner image processing until the point where target pixels disappear entirely. Thus, the threshold value for spectral correlation will lie between these two extremes.

Figure 4A:
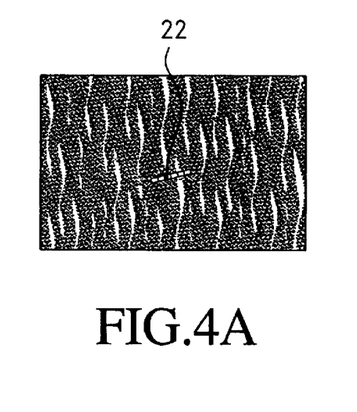
FIG. 4A is an example of a digital output from a multi-spectral camera used in the present invention.
Figure 4B:
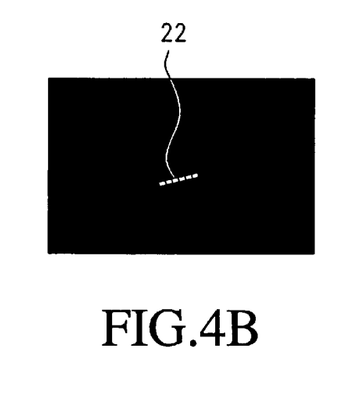
FIG. 4B is the same image shown in FIG. 4A but spectrally correlated with the spectral characteristics of the target.

FIG. 4A shows the digital output from the multi-spectral camera 2 before processing at 28. FIG. 4B shows the same image but spectrally correlated with the streamer spectral characteristics. The image plane is unlit (black) except where the streamer 22 has been located, where the pixels are lit. Thus, the spectral profile of the streamer 22 provides a unique signature used to detect a search and rescue target.

The spectrally correlated image of the streamer is then sent to image processing 30 to detect the presence of the streamer.

In image processing, the unique shape characteristic of the streamer 22 is used to provide detection. Since image processing is generally computationally demanding, the threshold plot shown in FIG. 4B is preferably processed, rather than the raw data coming from the camera 2, as depicted in FIG. 4A.

Figure 5:
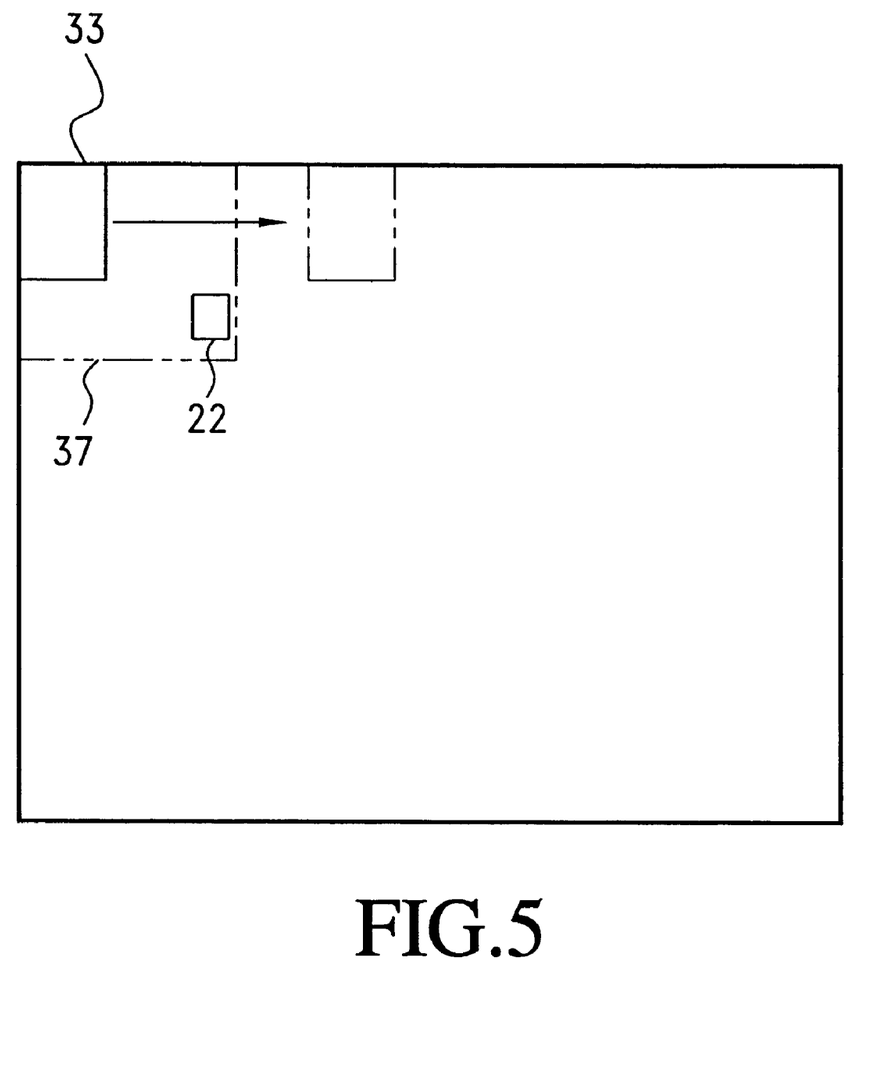
FIG. 5 shows a window sliding along the image output to compute the sliding sum within the window.

The binary 2-d correlation image shown in FIG. 4B is processed using an image processing algorithm that looks for objects with a streamer like morphology. This is done, technically, by sweeping a window 33 of a certain size (NXN) across and down the image. A count is made of the number of pixels that have a value of 1.0 inside the window. If the number of pixels counted is too high, there is a region of high false alarm (a huge orange boat would create false alarms, or more likely, a threshold which is too low and allows near orange objects to be detected). If the pixel count is too low, then one or two pixels have false alarmed. If the pixel count roughly corresponds to the size of the streamer, then an alarm sounds.

The sliding window parameter size is determined from flight altitude data, which is fixed prior to flight in search and rescue operation. A database 35 of shapes of interest is used in image processing.

Another method of image processing uses a larger sliding window 37 encompassing the smaller window 33. The sum of the inner and outer region of the windows are then thresholded to yield the processed image. If the sum is large, it means that there is a large false alarm region that can be discarded. If the sum is small, it means there is a single false alarm or "speckle", which is also discarded. This is a general way to remove false alarms, since the streamer is only a small portion of the total image (see FIGS. 4A and 4B).

The image processing target pixels sum must be chosen so that targets are detected without many false alarms. When this number is too small, excessive clutter is detected. When it is too large, targets are missed. A middle ground between these two numbers would provide target detection without many false alarms.

Image processing 30 may also use a two-dimensional correlation coefficient processing similar to the one-dimensional spectral processing described above to differentiate morphologic shapes in the correlation image. Two-dimensional integration of a known target template is performed with a windowed section of the thresholded correlation image. Two-dimensional-correlation technique is preferably used when targets have more complex shape, or higher spatial resolution data are processed to allow the device R to identify boat-like shapes and other possible rescue objects.

Image processing may also use the generalized Hough transform, a well-known mathematical transformation used to detect line segments and other simple objects. The streamer 22 is expected to straighten out in line-like fashion in overhead views.

An expert system 32 controls the extent of image processing. The expert system performs two tasks using simple "if... then" logical sentences. Image processing, such as the sliding window algorithm, is only to be used when spectral targets of interest are found. In addition, shape processing, such as the 2-correlation coefficient processing, will only be used if the sliding sum algorithm finds targets of interest. The expert system 32 controls the firing of the alarm 8. When the target object is found via either spectral or spatial output reaching threshold, the alarm 8 is activated.

Figure 6:
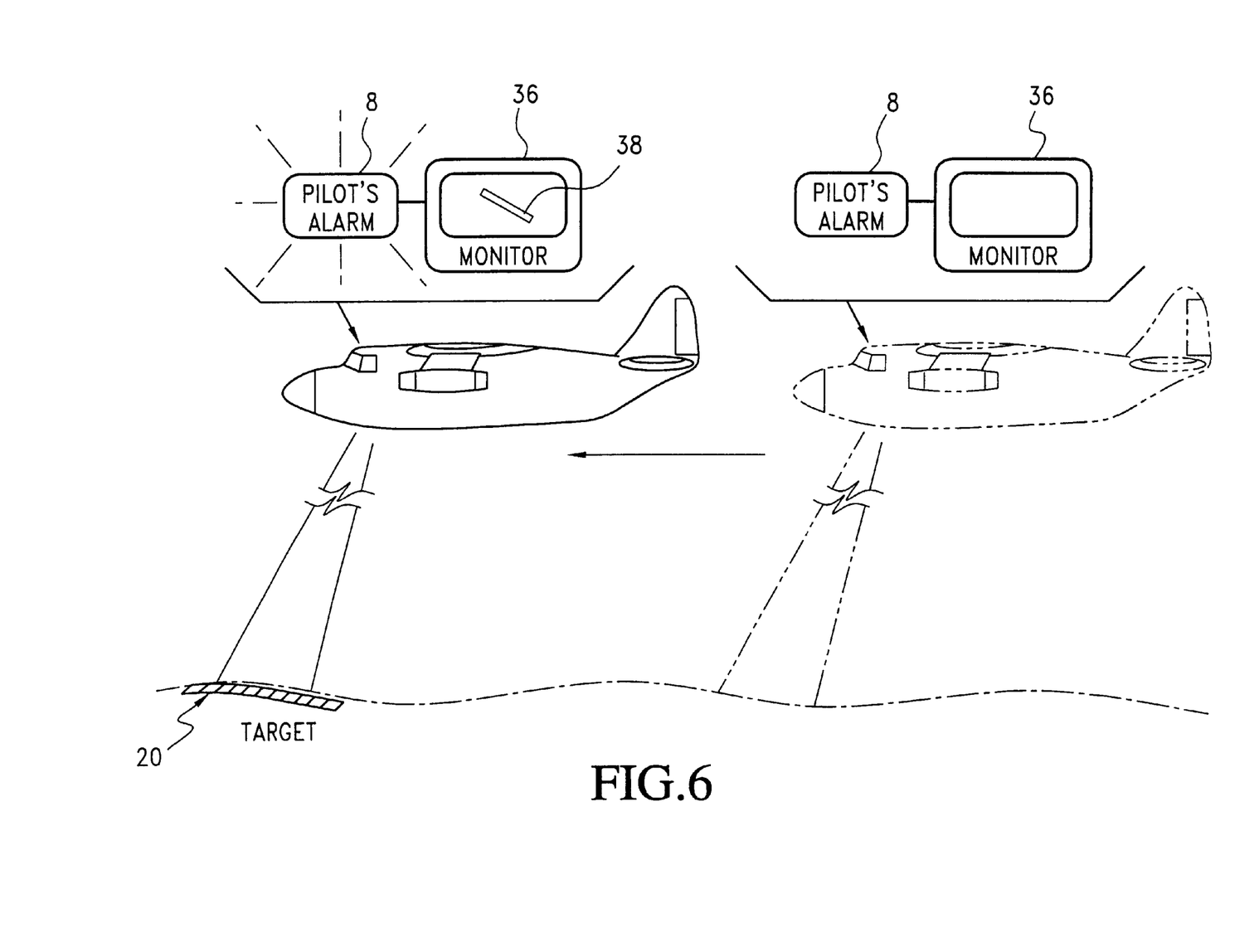
FIG. 6 is a schematic view of a target being recorded by the camera system and detected by the computer system resulting in alarm activation.

FIG. 6 shows a real-time scenario wherein the target 20 is photographed by the device R and the computer algorithm detects the unique spectral and/or spatial image of interest corresponding to the target. The computer algorithm immediately sounds an audio alarm that can be heard by the pilot, as well as recording the GPS coordinates that are displayed on a monitor 36 and permanently recorded for reference. The image 38 of the target may also be displayed on the monitor 36.

The algorithm 26 may include a graphical user interface for system control and monitoring, as well as visual and audio operator alarm cues. The system controls may include start up controls, alarm controls, search variable inputs such as altitude search height, etc.

Figure 7A:
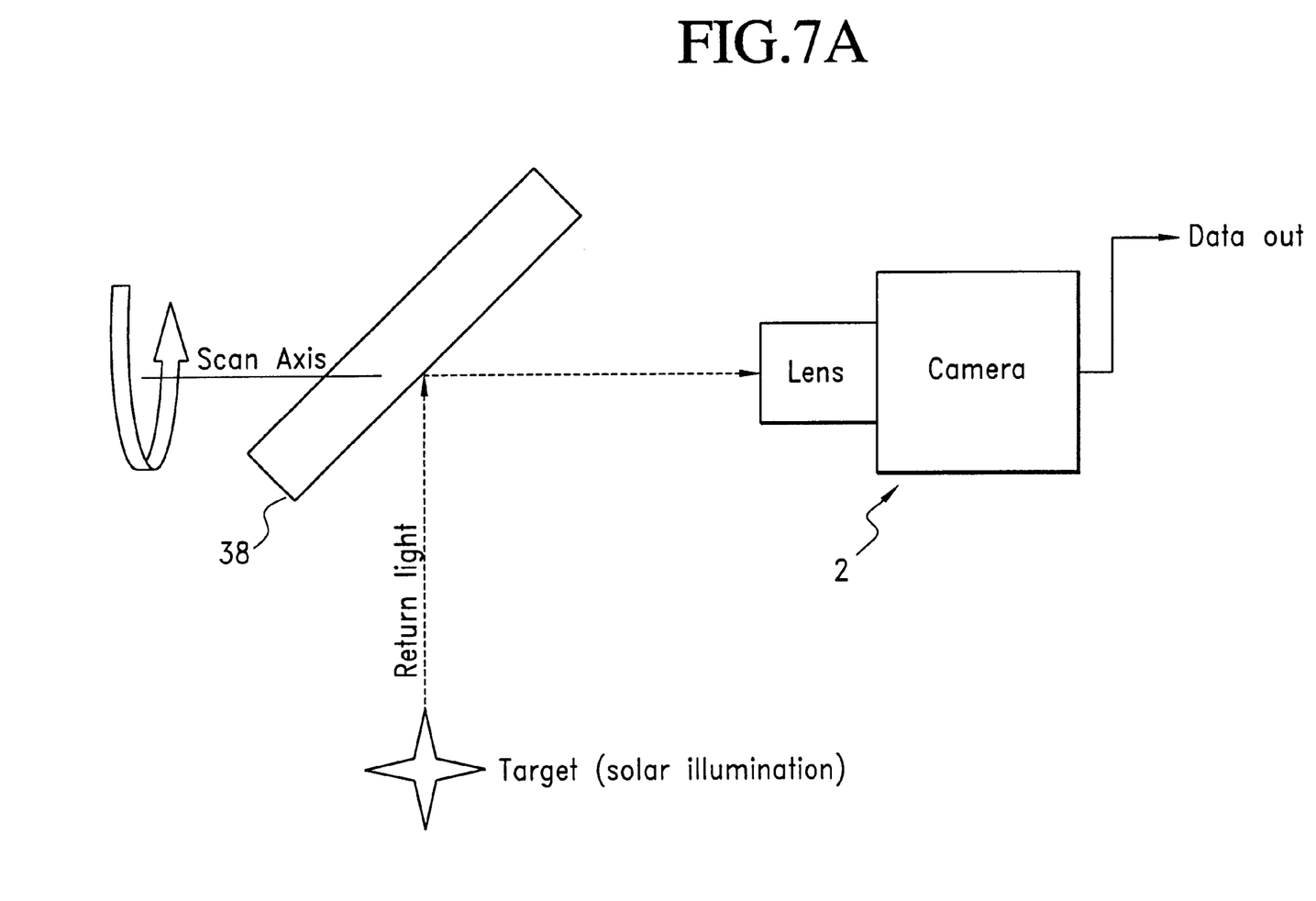
FIG. 7A is a schematic block diagram of the present invention using solar illumination.

An application using solar illumination is disclosed in FIG. 7A. The target area is scanned by a mirror 38 oscillating about a scan axis across the flight path of the aircraft (cross-track). The oscillation depends on the speed of the aircraft and the "along-track" (along the flight path of the aircraft) view of the camera 2. The mirror 38 may be positioned so that it is forward looking ahead of the aircraft.

Figure 8:
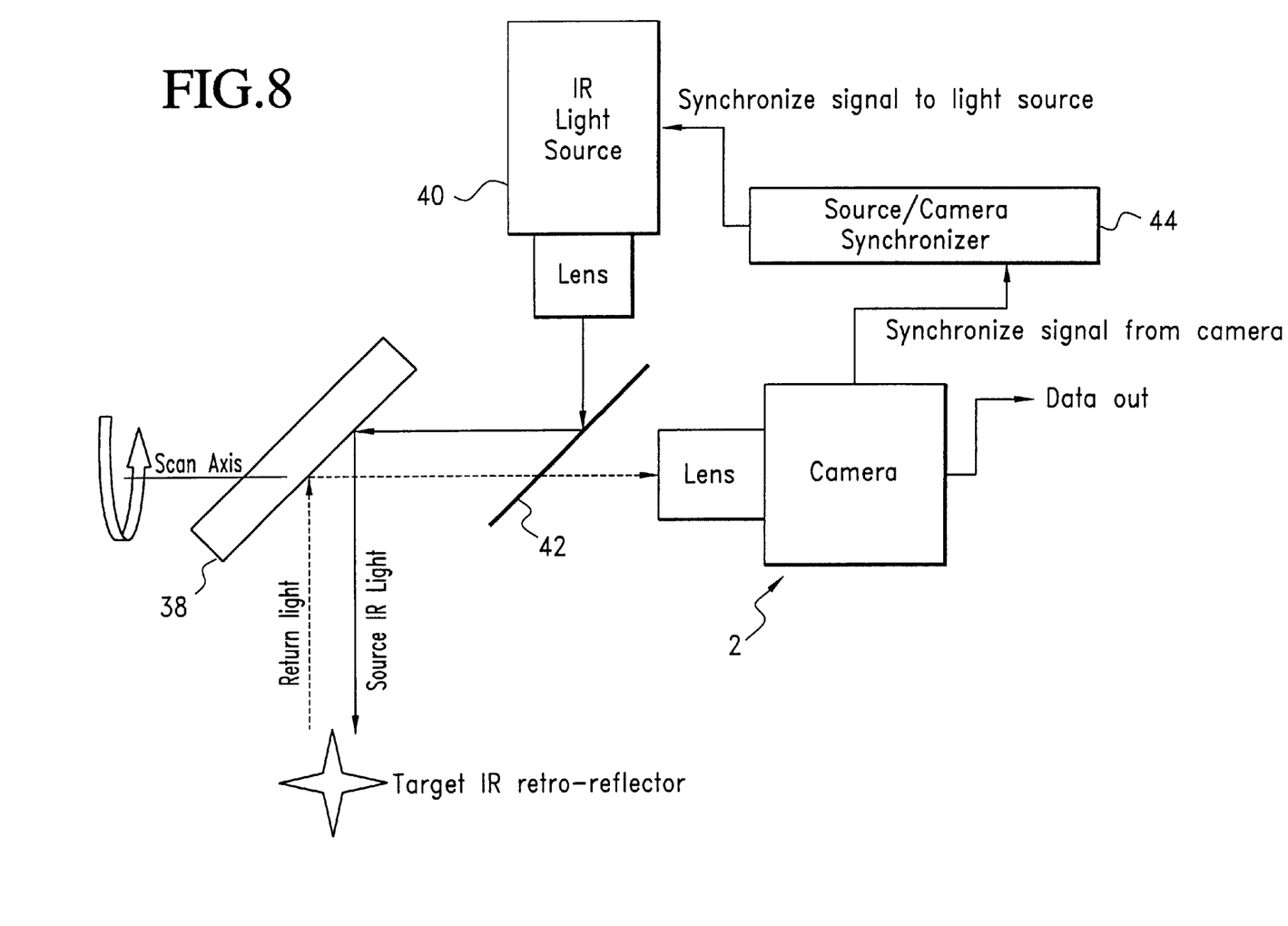
FIG. 8 is a schematic block diagram of the present invention using an IR light source.

An application using infrared reflectors on the streamer 22 or other targets is disclosed in FIG. 8. An IR light source 40, preferably in the 700–900 nm range, illuminates the target through a preferably 50% reflective/transmissive mirror 42. The IR light source may also be integrated with the camera. Reflected IR light is picked up by the camera 2 equipped with image intensifiers. A synchronizer 44 insures that the area being illuminated by the IR source is also the same area being imaged by the camera. This application would be useful in nighttime operations.

Figure 7B:
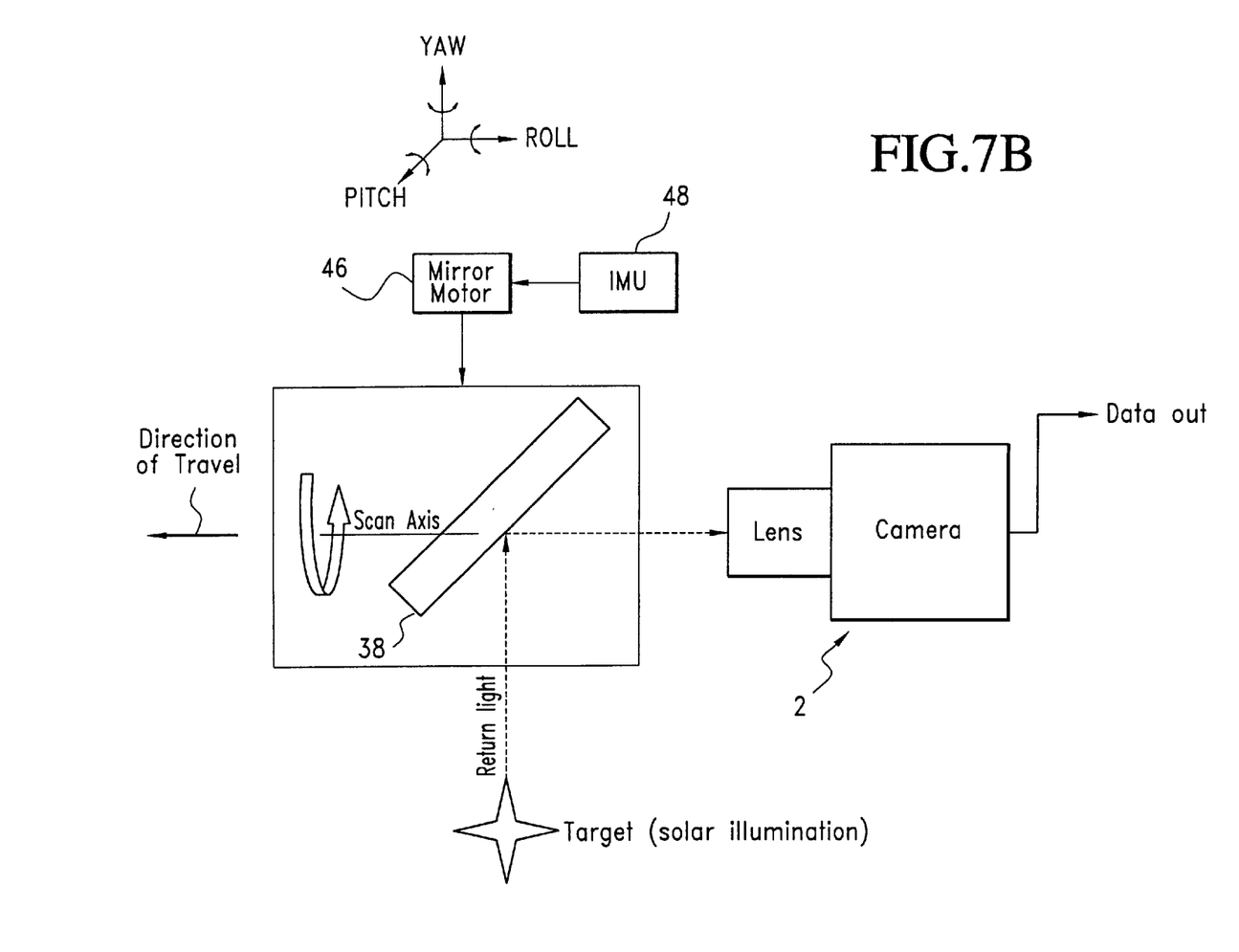
FIG. 7B is a schematic block diagram of FIG. 7A showing an embodiment of an image stabilization scheme as applied to the scanning mirror.
Figure 7C:
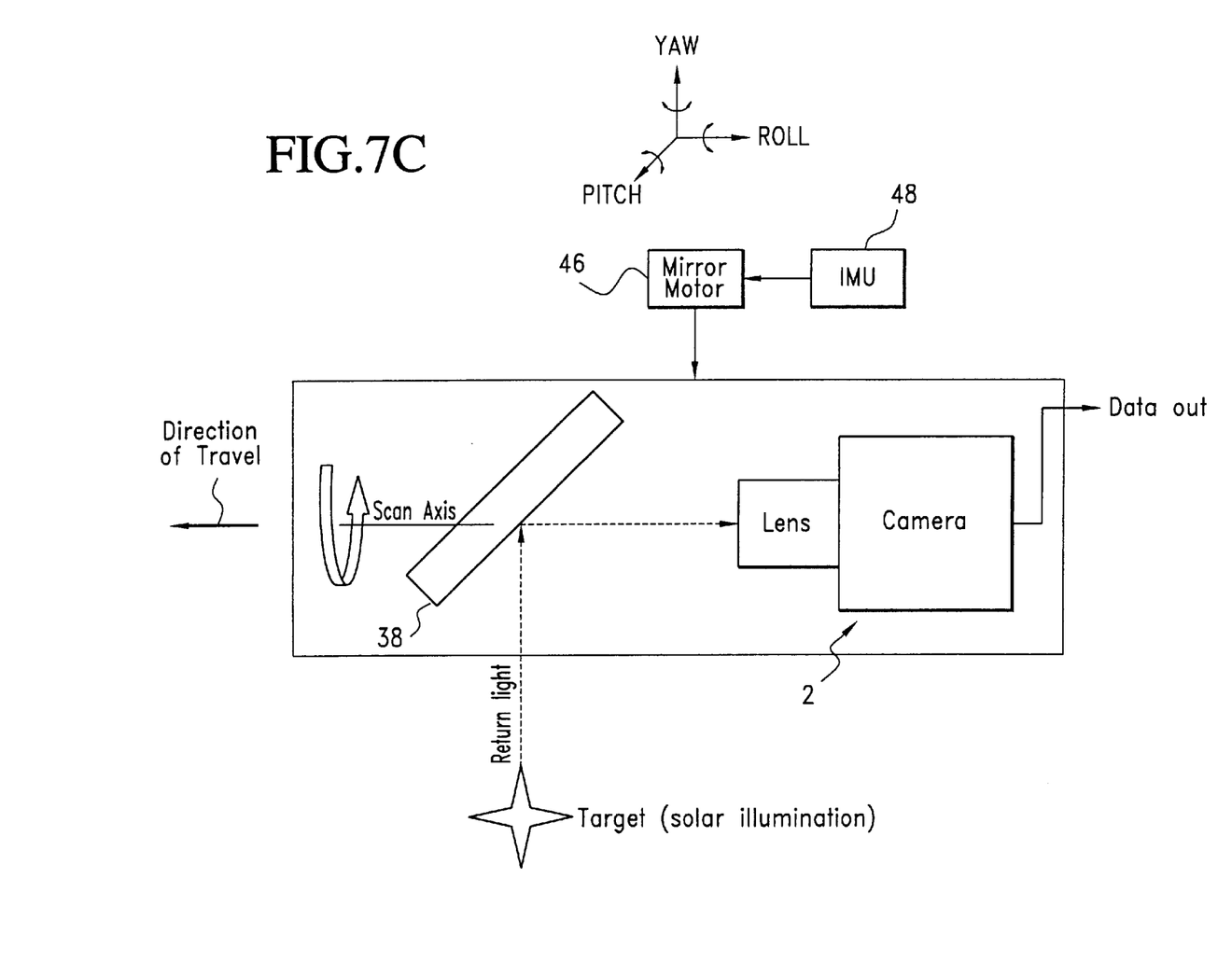
FIG. 7C is a schematic block diagram of FIG. 7A showing another embodiment of an image stabilization scheme as applied to the camera mount.

Referring to FIGS. 7B and 7C, the camera 2 may include mechanical image stabilization for yaw, pitch and roll, for pointing the optical axis of the camera 2 in a preferred orientation or direction (ahead of the direction of travel or to the side), to maintain a preferred field of view, or to view a spot on the earth (staring) so that a steady image is maintained for increasing the signal-to-noise of the detection. Referring to FIG. 7B, the mirror 38 is equipped with a motor 46 to correct the pointing of the mirror 38. The motor 46 comprises three orthogonally mounted motors controlled by an inertial measurement unit 48, which is a set of three orthogonally oriented gyroscopes for measuring the rates and degree of pitch (x-axis), roll (y-axis) and yaw (z-axis) induced by the motion of the aircraft or vehicle. The signals from the unit 48 are input to the respective motors 46. In this embodiment, stabilization uses the mirror 38 to steer the optical axis to the camera and the target.

Referring to FIG. 7C, the motor 46 is applied to the entire camera/mirror assembly mount to stabilize the assembly for yaw, pitch and roll. The inertial measurement unit 48 controls the three orthogonal motors that comprise the motor 46. In this embodiment, stabilization uses the mechanical mount of the mirror/camera assembly to steer the optical axis of the assembly to the target.

By using image stabilization, the camera 2 can scan along-track with time-delay-integration to increase the signal-to-noise for low light level operation, such as under clouds or when the sun is at low elevation.

Although the invention has been described emphasizing the ocean-oriented search and rescue applications, such as that used by the Coast Guard, the present invention can also be used for automatic search for persons or boats lost at sea using unpiloted vehicles. These applications would be useful in reducing the cost of equipment (aircraft) and in the operational cost used in searches. In addition, this type of searches may reduce the risk to the searchers, especially in hostile areas.

The present invention may be also used to increase the efficiency in monitoring ship and boat activity in cases where the spatial (size or type) or spectral (color) property of the target ships or boats in question is important. These features would be specially applicable in areas where is a high concentration of drug trafficking and normal boating.

The present invention will also be useful in land and environmental application where monitoring a specific crop (e.g. narcotics), environmental effects (e.g. oils spills, red tides, etc.), or land-used monitoring is important. In these cases, the spectral sensitivity of the device would be modified to match the spectral properties of the target materials and its background.

The apparatus can be mounted to the exterior of an aircraft through a pod or on the interior of the aircraft using a transparent window for the camera lenses. The camera can also be directed in a forward looking orientation on an aircraft to notify pilots of approaching targets. The apparatus can also be mounted on boats to facilitate water-based search and rescue operations or mounted to land vehicles, fixed land stations, and spacecrafts to facilitate search and rescue or surveillance and monitoring from a variety of vantage points.

With the present invention, the probability of detection of person lost at sea or on land, as well for applied surveillance and monitoring applications, is enhanced by augmenting search pilots' visual capabilities with the present invention, thereby increasing the chances of spotting select targets.

With the use of the present invention, large search areas can effectively be covered in shorter periods of time, with greater success rate.

Since time is the critical factor, anything that can be done to reduce the duration of the search and the time to a successful rescue is of value. Rescue personnel are well aware of the decreasing effectiveness of airborne visual searches caused by human fatigue during long searches and the limited ability of the human eye to identify small objects in the midst of a chaotic background. Airborne visual searches are performed mostly using low-flying aircraft with humans performing the search by looking in specific directions along the flight paths using protocols developed by the International Civil Aviation Organization and the International Maritime Organization. The present invention is an adjunct to the visual search to increase the ability to detect targets at greater distances than with only the human eye.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A device for locating a lost target having spectral and spatial characteristics, comprising:

a) a digital multi-spectral camera aimed at an area of interest where the target may be located, said camera generating spectral and spatial output; and b) a computer including a program for processing in real-time the spectral and spatial output of said camera, and triggering an alarm when the target is detected from the output.

2. A device as in claim 1, and further comprising a device for generating a GPS signal pertaining to a location of the target.

3. A device as in claim 1, wherein said processing program includes filtering the output of said camera based on the spectral characteristics of the target.

4. A device as in claim 3, wherein:
a) said filtering includes calculating the correlation coefficient of each pixel with a known spectral characteristic of the target and thresholding each pixel to generate a binary correlation image; and
b) said processing program includes detecting the target from said binary correlation image.

5. A device as in claim 4, wherein said detecting is performed only if the binary correlation image contains a target of interest.

6. A device as in claim 4, wherein:
a) said detecting includes passing a first window over said binary correlation image;
b) summing the pixel within said first window; and
c) alarming when the sum exceeds a threshold.

7. A device as in claim 4, wherein:
a) said detecting includes passing first and second windows over said binary correlation image, said second window encompassing said first window;
b) summing the pixels within said first window with the pixels inside said second window but outside said first window; and
c) alarming when the sum is above a lower threshold and below a higher threshold.

8. A device as in claim 4, wherein said processing program includes a 2-dimensional correlation of said binary correlation image with the target spatial characteristics.

9. A device as in claim 6, wherein said processing program includes a 2-dimensional correlation of binary correlation image with the target spatial characteristics only if the sum within the first window exceeds the threshold.

10. A device as in claim 1, wherein said camera includes a scanning mirror.

11. A device as in claim 10, and further comprising means for stabilizing said scanning mirror.

12. A device as in claim 1, and further comprising means for stabilizing said camera.

13. A device as in claim 1, wherein said camera includes a focal plane having a two-dimensional array detectors for framing camera imaging.

14. A device as in claim 1, wherein said camera includes a focal plane having linear array detectors.

15. A device as in claim 1, wherein said camera includes a focal plane comprising a spot detector.

16. A device as in claim 1, wherein said camera includes a focal plane comprising CCD detectors.

17. A device as in claim 1, wherein said camera is configured to image an IR illuminated target.

18. A device for locating a lost target having spectral and spatial characteristics, comprising:
a) means for imaging an area of interest where the target may be found, said imaging means generating spectral and spatial output; and
b) means for processing the spectral and spatial output of said imaging means and triggering an alarm when the target is detected from the output.

19. A device as in claim 18, and further comprising means for stabilizing said imaging means.

20. A method for locating a lost target having spectral and spatial characteristics, comprising:
a) imaging an area of interest where the target may be found with a multi-spectral digital camera;
b) calculating the correlation coefficient of each pixel with a known spectrum of the target;
c) generating a binary correlation image by setting each pixel to a value of one or zero if the correlation coefficient of the pixel is above or below a threshold, respectively;
d) detecting the target from the binary correlation image.

21. A method as in claim 20, wherein:
a) said detecting includes triggering an alarm.

22. A method as in claim 20, wherein said detecting is performed only if the binary correlation image contains a target of interest.

23. A method as in claim 20, wherein:
a) said detecting includes passing a first window over the binary correlation image;
b) summing the pixel within the window; and
c) alarming when the sum exceeds a threshold.

24. A method as in claim 20, wherein:
a) said detecting includes passing first and second windows over the binary correlation image, said second window encompassing said first window;
b) summing the pixels within the first window with the pixels inside the second window but outside the first window; and
c) alarming when the sum is above a lower threshold and below a higher threshold.

25. A method as in claim 24, wherein said detecting includes a 2-dimensional correlation of the binary correlation image with the target spatial characteristics only if the sum within the first window exceeds the threshold.

26. A method as in claim 20, and further comprising mounting the camera to a vehicle.

27. A method as in claim 26, wherein said imaging includes scanning the area across the direction of path of the vehicle.

28. A method as in claim 26, wherein said scanning is directed ahead of the direction of path of the vehicle.

29. A method as in claim 26, wherein said scanning is along the direction of travel of the vehicle.

30. A method as in claim 26, wherein the vehicle is an aircraft.

31. A method as in claim 26, and further comprising stabilizing the camera to compensate for motions of the vehicle.

32. An apparatus for surveillance and monitoring of an area for a target having spectral and spatial characteristics, comprising:
a) a digital multi-spectral camera aimed at or scanning an area of interest where the target may appear, said camera generating spectral and spatial output; and
b) a computer including a program for processing in real-time the spectral and spatial output of said camera, and triggering an alarm when the target is detected from the output.

33. An apparatus as in claim 32, and further comprising means for alerting an operator of the location of the target.

* * * * *